(12) United States Patent
Zhang

(10) Patent No.: US 9,957,867 B2
(45) Date of Patent: May 1, 2018

(54) METHOD AND SYSTEM FOR EMISSIONS REDUCTION

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/081,040

(22) Filed: Mar. 25, 2016

(65) Prior Publication Data
US 2017/0276045 A1    Sep. 28, 2017

(51) Int. Cl.
| | |
|---|---|
| *F01N 3/00* | (2006.01) |
| *F01N 3/20* | (2006.01) |
| *F01N 3/10* | (2006.01) |
| *F02B 37/18* | (2006.01) |
| *F02D 11/10* | (2006.01) |
| *F02D 41/00* | (2006.01) |
| *F02D 41/02* | (2006.01) |
| *F02D 41/06* | (2006.01) |

(52) U.S. Cl.
CPC .......... *F01N 3/2006* (2013.01); *F01N 3/101* (2013.01); *F02B 37/183* (2013.01); *F02D 11/105* (2013.01); *F02D 41/0007* (2013.01); *F02D 41/027* (2013.01); *F02D 41/064* (2013.01); *F02D 2200/021* (2013.01)

(58) Field of Classification Search
USPC ......... 60/274, 280, 287, 288, 289, 292, 293, 60/296, 323, 324
See application file for complete search history.

(56) References Cited

U.S. PATENT DOCUMENTS

| | | | |
|---|---|---|---|
| 4,244,187 A | 1/1981 | Lane et al. | |
| 5,024,054 A * | 6/1991 | Barris | F01N 3/027 60/274 |
| 5,603,216 A * | 2/1997 | Guile | F01N 3/0814 60/288 |
| 5,910,097 A | 6/1999 | Boegner et al. | |
| 6,233,926 B1 * | 5/2001 | Bailey | F01N 3/0222 137/625.31 |
| 6,325,054 B1 * | 12/2001 | Wenger | F01N 3/2006 123/559.2 |
| 6,820,417 B2 * | 11/2004 | May | B01D 53/9431 422/169 |
| 7,370,474 B2 * | 5/2008 | Minami | F01N 3/0231 60/286 |

(Continued)

*Primary Examiner* — Binh Q Tran
(74) *Attorney, Agent, or Firm* — Julia Voutyras; McCoy Russell LLP

(57) ABSTRACT

Methods and systems are provided for operating a branched exhaust assembly in a vehicle engine in order to increase catalyst efficiency and reduce engine emissions. In one example, a method may include, during a cold-start condition, flowing exhaust first through a three-way catalyst then through an underbody converter and then through a turbine, each exhaust component housed on different branches on the branched exhaust assembly. After catalyst activation, exhaust may flow first through the turbine, then through the underbody converter and then through the three-way catalyst, and during high engine load, exhaust may simultaneously flow through two branches of the branched exhaust assembly, partially bypassing the turbine.

20 Claims, 6 Drawing Sheets

(56) References Cited

U.S. PATENT DOCUMENTS

| | | | |
|---|---|---|---|
| 7,891,173 B2 * | 2/2011 | Akaba | F01N 3/0814 |
| | | | 60/274 |
| 8,191,354 B2 * | 6/2012 | Cavataio | F01N 3/08 |
| | | | 60/274 |
| 8,234,865 B2 | 8/2012 | Andrews | |
| 8,555,636 B2 | 10/2013 | Schwarzenthal et al. | |
| 9,593,619 B2 * | 3/2017 | Zhang | F01N 13/08 |
| 2010/0251700 A1 | 10/2010 | Wan et al. | |

* cited by examiner

FIG. 4

| Engine temperature | Engine load | Exhaust system mode | Valve_1 position | Valve_2 position | Direction of exhaust flow |
|---|---|---|---|---|---|
| 1 – Cold start | Low/moderate | 1st | First | First | First through catalyst, then through underbody converter, and then through turbine |
| 2 – Warm | Low/moderate | 2nd | Second | Second | First through turbine, then through underbody converter, and then through catalyst |
| 3 – Warm | High | 3rd | Third | Second | First part of exhaust first through turbine, then through underbody converter, and then through catalyst and simultaneously a second part of exhaust only through catalyst |

METHOD AND SYSTEM FOR EMISSIONS REDUCTION

FIELD

The present description relates generally to methods and systems for controlling a vehicle engine to increase catalyst efficiency and reduce engine emissions.

BACKGROUND/SUMMARY

Engines may be operated with boosted aircharge provided via a turbocharger wherein an intake compressor is driven by an exhaust turbine. However, placing a turbine in an exhaust system can increase engine cold-start emissions due to the turbine acting as a heat sink. In particular, engine exhaust heat during the engine cold-start may be absorbed at the turbine, lowering the amount of exhaust heat that is received at a downstream exhaust catalyst. As such, this delays catalyst light-off. Consequently, spark retard may be required in order to activate the exhaust catalyst. However, the fuel penalty associated with the spark retard usage may offset or even outweigh the fuel economy benefit of the boosted engine operation.

Accordingly, various approaches have been developed to expedite the attainment of a catalyst light-off temperature during cold-start conditions in a boosted engine. One example approach, shown by Andrews in U.S. Pat. No. 8,234,865 involves routing exhaust gas towards an exhaust tailpipe via a passage that bypasses the exhaust turbine during cold-start conditions. A passive, thermatically operated valve is used to regulate the flow of exhaust through the passage, the valve opening during low-temperature conditions (such as during cold-start). The thermatically operated valve comprises a bi-metallic element which distorts based on temperature thereby regulating the opening of the valve. By circumventing the turbine, exhaust heat may be directly delivered to the exhaust catalyst.

However, the inventors herein have recognized potential issues with such systems. As one example, due to the exhaust bypassing the turbine, there may be a delay in turbine spin-up, resulting in turbo-lag and reduced boost performance. Furthermore, after catalyst light-off, the temperature of the unobstructed exhaust reaching the catalyst may be higher than desired. In particular, owing to a coating on the catalyst surface (such as on the surface of an exhaust oxidation catalyst or three-way catalyst), the catalyst may have higher conversion efficiencies at lower exhaust temperatures. As a result, the higher than desired temperature of exhaust reaching the catalyst may result in reduced catalyst functionality.

The inventors herein have identified an approach by which the issues described above may be at least partly addressed. One example method for a boosted engine comprises: during an engine cold-start, flowing exhaust first through a three-way catalyst then through an underbody converter and then a turbine; after catalyst light-off, flowing exhaust first through the turbine, then through the underbody converter, and then through the three-way catalyst; and during high load operation, bypassing the turbine at least partially. In this way, exhaust heat may be used to reduce turbo lag while expediting catalyst light-off.

In one example, a turbocharged engine system may be configured with a branched exhaust assembly wherein the exhaust passage is divided into at least three separate branches, each creating a distinct flow path. The branches may be interconnected to each other via valves such that an order of exhaust flow along each of the flow paths can be adjusted via adjustments to a position of the valves. Distinct exhaust components may be coupled to distinct branches of the branched exhaust assembly. For example, an exhaust turbine of the turbocharger may be coupled to a first branch, an underbody convertor may be coupled to a second branch, and an exhaust oxidation catalyst (three-way catalyst) may be coupled to a third branch of the exhaust assembly. During cold-start conditions, the valves may be adjusted to flow exhaust through the catalyst, then through the underbody converter, and then through the turbine. After catalyst light-off, the valves may be adjusted to flow exhaust first through the turbine, then through the underbody converter, and then through the catalyst. During high engine load conditions, such as while operating with boost, the valves may be adjusted such that exhaust may be simultaneously routed to the tailpipe through two separate flow paths. For example, a first portion of exhaust gas may flow first through turbine, then through the underbody converter, and then through the light-off catalyst before exiting via the tail pipe. A second (remaining) portion of the exhaust gas may directly flow through the light-off (activated) catalyst bypassing the turbine and the underbody converter before exiting via the tail pipe. The portion of the exhaust routed through the catalyst relative to the portion routed through the turbine is adjusted based on engine load.

In this way, by routing exhaust through different flow-paths of a branched exhaust assembly, it is possible to expedite attainment of catalyst light-off temperature while providing boost to the engine during cold-start conditions. Specifically, exhaust can be flowed through each of a turbine, an exhaust catalyst, and an underbody converter, with an order of exhaust flow through the components adjusted based on operating conditions. By adjusting exhaust flow during cold-start conditions to route hot exhaust through an exhaust catalyst, before flowing the exhaust through the remaining exhaust components, exhaust heat may be effectively transferred to the catalyst, expediting catalyst activation. By adjusting the exhaust flow after catalyst activation to route the hot exhaust through an exhaust turbine before flowing the exhaust through the remaining exhaust components, turbo lag is reduced. In addition, a temperature of the exhaust received at the catalyst is lowered, improving catalyst conversion efficiency. By routing exhaust via multiple flow paths in the exhaust assembly, it is possible to partially bypass the turbine thereby reducing the possibility of boost error during high engine load conditions. The technical effect of using valves to regulate an order of exhaust flow through the exhaust components housed in distinct branches of the branched exhaust assembly is that exhaust heat can be directed to a specific component first, as required based on engine operating conditions, irrespective of the order of the exhaust components relative to each other in the exhaust assembly. Overall, by changing an order of exhaust flow through exhaust components, engine efficiency, emissions quality, and fuel efficiency may be improved in a boosted engine system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a table illustrating the different modes of operation of the branched exhaust assembly.

DETAILED DESCRIPTION

Figure 1:
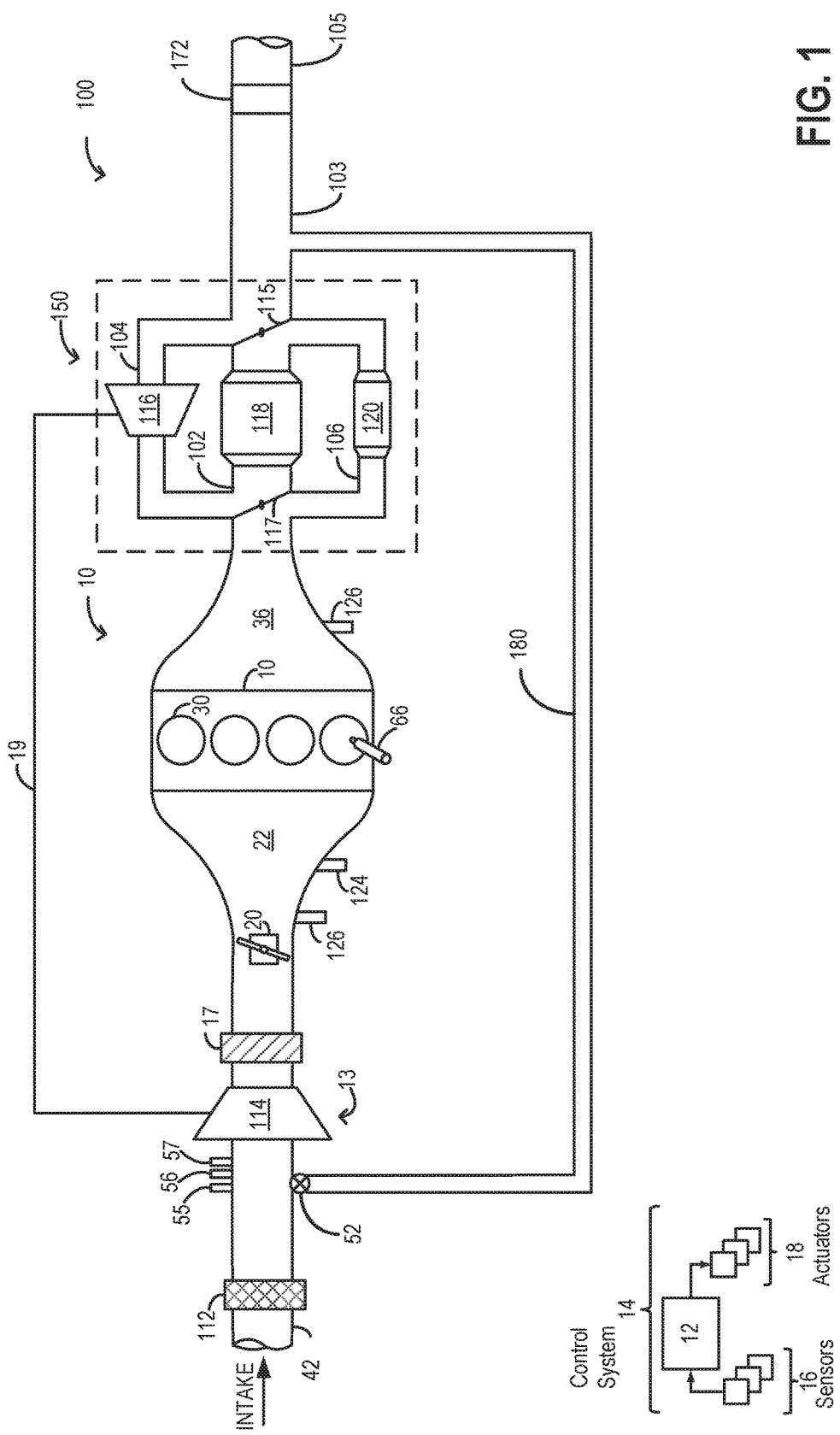
FIG. 1 shows an example embodiment of an engine system including a branched exhaust assembly.

The following description relates to systems and methods for increasing catalyst efficiency and reducing engine emissions while providing boost to an engine system. An example engine system comprising a branched exhaust assembly is shown in FIG. 1. Distinct exhaust manifold components such as a turbine, an underbody convertor, and a three-way catalyst may be housed in distinct branches of the assembly. The different modes of operation of the branched exhaust assembly are elaborated with reference to FIGS. 2A, 2B, and 2C. An engine controller may be configured to perform a control routine, such as the example routine of FIG. 3, to route exhaust through different branches of the branched exhaust assembly based on engine operating conditions and temperature requirement of the respective components. The different modes of operation of the branched exhaust assembly are tabulated at FIG. 4. An example operation of the branched exhaust assembly of FIG. 1 is shown with reference to FIG. 5.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled, through charge-air cooler (CAC) 18 to throttle valve 20. Throttle valve 20 is coupled to engine intake manifold 22. From the compressor, the compressed air charge flows through the charge-air cooler 18 and the throttle valve to the intake manifold. In the embodiment shown in FIG. 1, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

Intake manifold 22 is coupled to a series of combustion chambers 30 through a series of intake valves (not shown). The combustion chambers are further coupled to exhaust manifold 36 via a series of exhaust valves (not shown). In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, the exhaust manifold 36 may lead to a branched exhaust assembly 12 wherein the exhaust passage 103 is divided into three separate branches, each creating a distinct flow path. The branches may be fluidically connected to each other via two four-ways valves 117 and 115 such that an order of exhaust flow along each of the flow paths can be adjusted via adjustments to a position of each of the valves. Separate exhaust components may be coupled to each branch of the branched exhaust assembly. For example, the exhaust turbine 116 of the turbocharger 13 may be coupled to a first branch 104, an underbody convertor 118 may be coupled to a second branch 102, and a three-way catalyst (TWC) 120 may be coupled to a third branch 106 of the exhaust assembly 150.

During cold-start conditions (first condition), the valves 117 and 115 may be adjusted to flow exhaust first through the third branch 106 housing the three-way catalyst 120, then through the second branch 102 housing the underbody converter 118, and then through the first branch 104 housing the turbine 116. By first routing the hot exhaust through the catalyst, before flowing the exhaust through the remaining exhaust components, heat may be effectively transferred to the catalyst to expedite attainment of catalyst light off. By flowing the exhaust through the turbine 116, boost may be provided to the engine even during cold-start conditions. After catalyst activation (second condition), the valves 117 and 115 may be adjusted to flow exhaust first through the first branch 104 housing the turbine 116, then through the second branch 102 housing the underbody converter 118, and then through the third branch 106 housing the three-way catalyst 120. By adjusting the exhaust flow to route the hot exhaust through the turbine 116 before flowing the exhaust through the remaining exhaust components, turbo lag may be reduced. In addition, a temperature of the exhaust received at the catalyst 120 may be lowered thereby improving catalyst conversion efficiency. During, high engine load conditions (third condition), the valves 117 and 115 may be adjusted such that the exhaust may be simultaneously routed towards the tailpipe 105 via multiple branches of the exhaust assembly 150 without the requirement of an additional wastegate valve and passage. A first portion of exhaust may first flow through the first branch 104 housing the turbine 116, then through the second branch 102 housing the underbody converter 118, and then through the third branch 106 housing the three-way catalyst 120, and a second, remaining portion of the exhaust may flow only through the three-way catalyst 120 (housed on the third branch 106), bypassing the turbine 116 and the underbody converter 118. A ratio of the first portion to the second portion may be adjusted based on driver demand and boost error. In this way, by reducing exhaust pressure upstream of the turbine, turbine speed can be reduced, which in turn may help to reduce compressor surge. All or part of the treated exhaust exiting the branched exhaust assembly 150 may flow downstream via exhaust passage 103 and may be released into the atmosphere via tailpipe 105 after passing through a muffler 172. Detailed description of the operation and structure of the branched exhaust assembly 150 will be discussed with relation to FIGS. 2A, 2B, 2C, 3, 4, and 5.

In another example embodiment, one exhaust after-treatment device may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

Exhaust gas recirculation (EGR) passage 180 may be coupled to the exhaust passage 103 at a location downstream of branched exhaust assembly 150 for delivery of low-pressure EGR (LP-EGR) from downstream of the turbine 116 in the exhaust passage 103 to the intake manifold 22 upstream of the compressor 114. Depending on operating conditions such as engine temperature, a portion of the exhaust residuals may be diverted to the inlet of compressor 114 via exhaust gas recirculation (EGR) valve 52 and EGR passage 180. EGR valve 52 may be opened to admit a controlled amount of exhaust gas to the compressor inlet for desirable combustion and emissions control performance. EGR valve 52 may be configured as a continuously variable valve. In an alternate example, however, EGR valve 52 may be configured as an on/off valve.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the branched exhaust assembly 150, MAP sensor 124, exhaust temperature sensor, exhaust pressure sensor, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 100. The actuators 81 may include, for example, throttle 20, EGR valve 52, four-way valves 117 and 115, and fuel injector 66. The control system 14 may include a controller 12. The controller 12 may receive input data from the various sensors, process the input data, and trigger various actuators in response to the processed input data based on instruction or code programmed therein corresponding to one or more routines. For example, based on engine operating conditions such as engine temperature and engine load, the controller 12 may regulate the opening of the four-way valves 117 and 115 to direct exhaust gas through the different flow-paths of the branched exhaust assembly 150. An example control routine is described with regard to FIG. 3. As another example, also based on engine operating conditions, opening of EGR valve 52 may be adjusted to draw a desired amount of EGR from the exhaust passage 103 into the engine intake manifold.

Figure 2A:
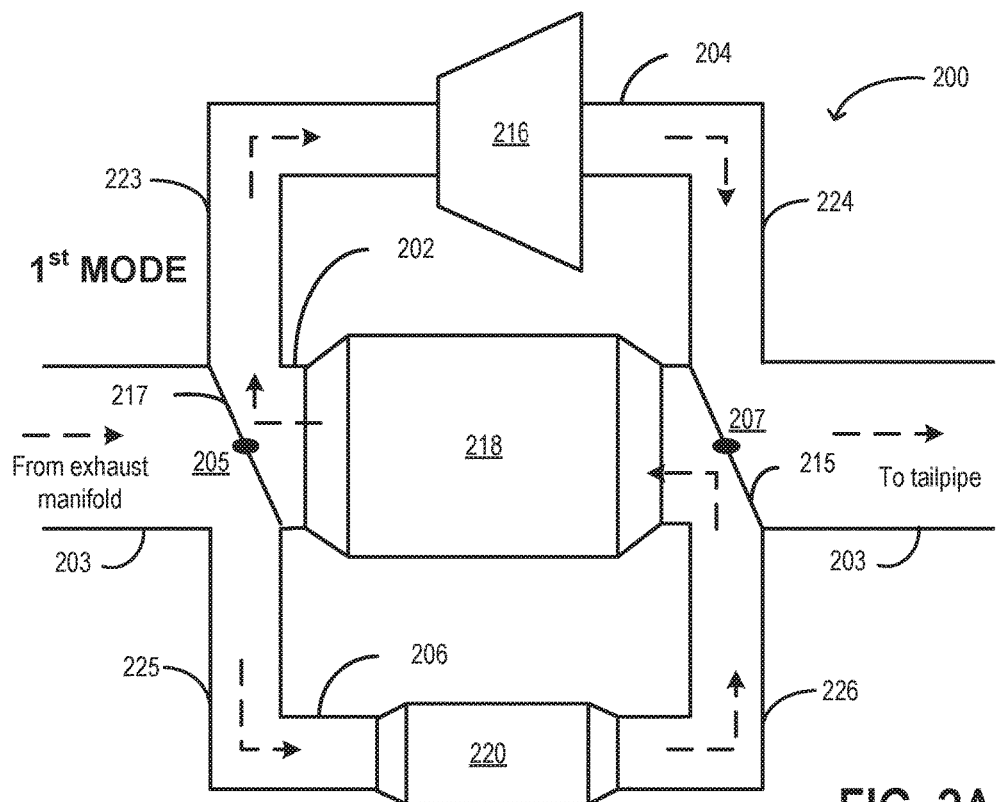
FIG. 2A shows an example embodiment of the branched exhaust assembly of FIG. 1 operating in a first mode.

FIG. 2A further elaborates the branched exhaust assembly introduced in FIG. 1 and shows an example embodiment 200 of operating the branched exhaust assembly in a first operating mode. In one example, assembly 200 is an embodiment of assembly 150 of FIG. 1 and therefore may share common features and/or configurations as those already described for branched exhaust assembly 150.

The branched exhaust assembly 200 is disposed on the main exhaust passage 203 downstream of the engine exhaust manifold and upstream of the tailpipe. At junction 205, the main exhaust passage 203 may divide into three separate branches each creating a distinct flow-path. A first four-way valve 217 may be coupled to the main exhaust passage 203 at a first end (proximal to the exhaust manifold) of each of the three branches, specifically at the junction 205. The valve 217 may be actuated to one of three different positions in order to regulate the direction of exhaust flow through the three branches based on engine operating conditions. A second four-way valve 215 may be coupled to the main exhaust passage 203 at a second end (proximal to the tailpipe) of each of the three branches (at the junction 207). The valve 215 may be positioned in two different configurations in order to regulate the direction of exhaust flow through the three branches based on engine operating conditions. The valves 217 and 215 fluidically connect the three branches and may be actuated in a coordinated manner to facilitate desired flow of exhaust through the branched exhaust assembly 200.

A first inlet pipe 223 may originate from the main exhaust passage 203 at the junction 205. The first inlet pipe 223 may lead to the first branch 204. A turbine 216 may be housed on the first branch 204. In one example, the turbine 216 may be a variable geometry turbine. Downstream of the turbine 216, a first outlet pipe 224 may originate from the first branch 204 and terminate at a junction 207 of the exhaust assembly 200. A part of the main exhaust passage 203 may constitute the second branch 202. The second flow-path may originate at the junction 205 and may end (merge with the main exhaust passage 203) at junction 207. An underbody convertor 218 may be housed on the second branch 202. In an alternate embodiment, for a diesel engine, a diesel particulate filter (DPF) or a selective catalytic reduction (SCR) device may be housed on the second branch 202. A second inlet pipe 225 may originate from the main exhaust passage 203 at the junction 205. The second inlet pipe 225 may lead to the third branch 206. A three way catalyst (TWC) 220 may be housed on the third branch 206. Downstream of the catalyst 220, a second outlet pipe 226 may originate from the branch 206 and terminate at a junction 207 of the exhaust assembly. In an alternate embodiment, for a diesel engine, a diesel oxidation catalyst may be housed on the third branch 206. The three flow-paths 204, 202, and 206 may be largely parallel to each other.

Based on engine operating conditions and temperature requirement at each exhaust component (turbine, underbody converter and catalyst), the order of exhaust flow through each of the components may be adjusted without the requirement of bypassing any component. Based on the position of the valves 217 and 215, exhaust may be routed from the main exhaust passage 203 through each of the branches of the exhaust assembly 200 (in different orders). The exhaust assembly 200 may be operated in three operational modes.

As such, the first operating mode represents a first setting of the four-way valves 217 and 215 that enables exhaust flow control. In the first operating mode, the first four-way valve 217 may be in a first position and the second four-way valve 215 may also be in a first position. When in the first operating mode, due to position of the first valve 217, the entire volume of exhaust flowing downstream via the main exhaust passage 203 may enter the second inlet pipe 225 at junction 205. From the second inlet pipe 225, the exhaust may continue to flow through the three-way catalyst (TWC) 220 housed on the third branch 206 of the exhaust assembly 200 in a first direction (from a first end of the TWC proximal to the engine exhaust manifold to the second end of the TWC proximal to the tailpipe). After exiting the TWC 220, the exhaust continues to flow downstream via the third branch 206 into the second outlet pipe 226. Due to the position of the second valve 215, upon reaching the junction 207, the exhaust may be routed through the underbody converter 218 housed on the second branch 202 in a second direction (from a second end of the underbody converter proximal to the tailpipe to the first end of the underbody converter proximal to the engine exhaust manifold). Herein, the second direction is opposite to the first direction. After exiting the underbody converter 218, the exhaust continues to flow via the second branch 202 towards the junction 205. At the junction 205, the exhaust may then enter the first inlet pipe 223. From the first inlet pipe 223, the exhaust may continue to flow through the turbine 216 housed on the first branch 204 of the exhaust assembly 200 in the first direction (from a first end of the turbine proximal to the engine exhaust manifold to the second end of the turbine proximal to the tailpipe). After exiting the turbine 216, the exhaust may continue to flow downstream via the first branch 204 into the first outlet pipe 224. Upon reaching the junction 207 (via the first outlet pipe 224), the exhaust may exit the branched exhaust assembly 200 and may continue to flow downstream towards the tailpipe via the main exhaust passage 203. In this way, exhaust may flow through the turbine housed on a first branch in a first direction, through the underbody converter housed on a second branch in a second direction, and through the three-way catalyst housed on a third branch in the first direction, wherein the second direction is opposite to the first direction.

The branched exhaust assembly may be operated in the first operating mode (as described above) during cold-start conditions. By adjusting exhaust flow to route hot exhaust first through the TWC 220, before flowing the exhaust through the remaining exhaust components (turbine 216 and underbody catalyst 218), exhaust heat may be effectively transferred to the catalyst, expediting catalyst activation. Therefore, hot exhaust may be effectively used for increasing TWC temperature reducing the need for spark retard, thereby increasing fuel efficiency of the engine. By attaining the TWC 220 light-off temperature faster, emissions quality may be improved. Also, by routing the exhaust through the turbine 216, during cold-start conditions, any delays in turbine spin-up may be reduced thereby reducing turbo-lag and enhancing boost performance.

Figure 2B:
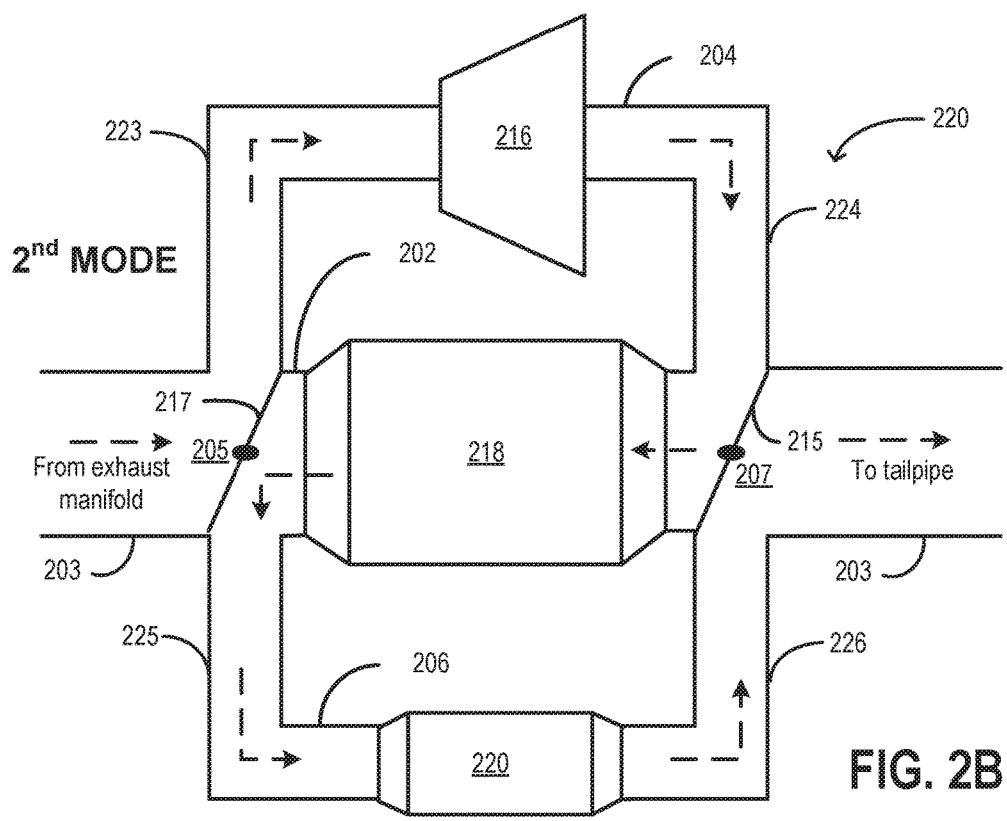
FIG. 2B shows an example embodiment of the branched exhaust assembly of FIG. 1 operating in a second mode.

FIG. 2B shows a schematic view 210 of an example embodiment of an exhaust bypass assembly 200 in a second operating mode. Components previously introduced in FIG. 2A are numbered similarly and not reintroduced.

The second operating mode represents a second setting of the four-way valves 217 and 215 that enables exhaust flow control. In the second operating mode, the first four-way valve 217 may be in a second position and the second four-way valve 215 may also be in a second position. When in the second operating mode, due to the position of the first valve 217, the entire volume of exhaust flowing downstream via the main exhaust passage 203 may enter the first inlet pipe 223 at junction 205. From the first inlet pipe 223, the exhaust may continue to flow through the turbine 216 housed on the first branch 204 of the exhaust assembly 200, in a first direction (from a first end of the turbine proximal to the engine exhaust manifold to the second end of the turbine proximal to the tailpipe). After exiting the turbine 216, the exhaust continues to flow downstream via the first branch 204 onto the first outlet pipe 224. Due to the position of the second valve 215, upon reaching the junction 207, the exhaust may be routed through the underbody converter 218 housed on the second branch 202 in a second direction (from a second end of the underbody converter proximal to the tailpipe to the first end of the underbody converter proximal to the engine exhaust manifold). After exiting the underbody converter 218, the exhaust continues to flow via the second branch 202 towards the junction 205. At the junction 205, the exhaust may then enter the second inlet pipe 225. From the second inlet pipe 225, the exhaust may flow through the three-way catalyst (TWC) 220 housed on the third branch 206 of the exhaust assembly 200, in a first direction (from a first end of the TWC proximal to the engine exhaust manifold to the second end of the TWC proximal to the tailpipe). After exiting the TWC 220, the exhaust may continue to flow downstream via the third branch 206 onto the second outlet pipe 226. Upon reaching the junction 207 (via the second outlet pipe 226), the exhaust may exit the branched exhaust assembly 200 and may continue to flow downstream towards the tailpipe via the main exhaust passage 203.

The branched exhaust assembly may be operated in the second operating mode (as described above) once the TWC 220 is fully activated (after attainment of light-off temperature). During this time, the engine load may be low/moderate and engine temperature may be higher. By adjusting exhaust flow to route hot exhaust first through the turbine, boost performance may be enhanced in the low-medium load region. Once the exhaust passes through the turbine, the temperature of the exhaust may drop. Owing to a coating on the catalyst surface, the TWC 220 may have a higher conversion efficiency at lower exhaust temperatures. As a result, the low temperature exhaust reaching the TWC 220 (after passing through turbine 216) may result in an optimal performance of the TWC 220.

Figure 2C:
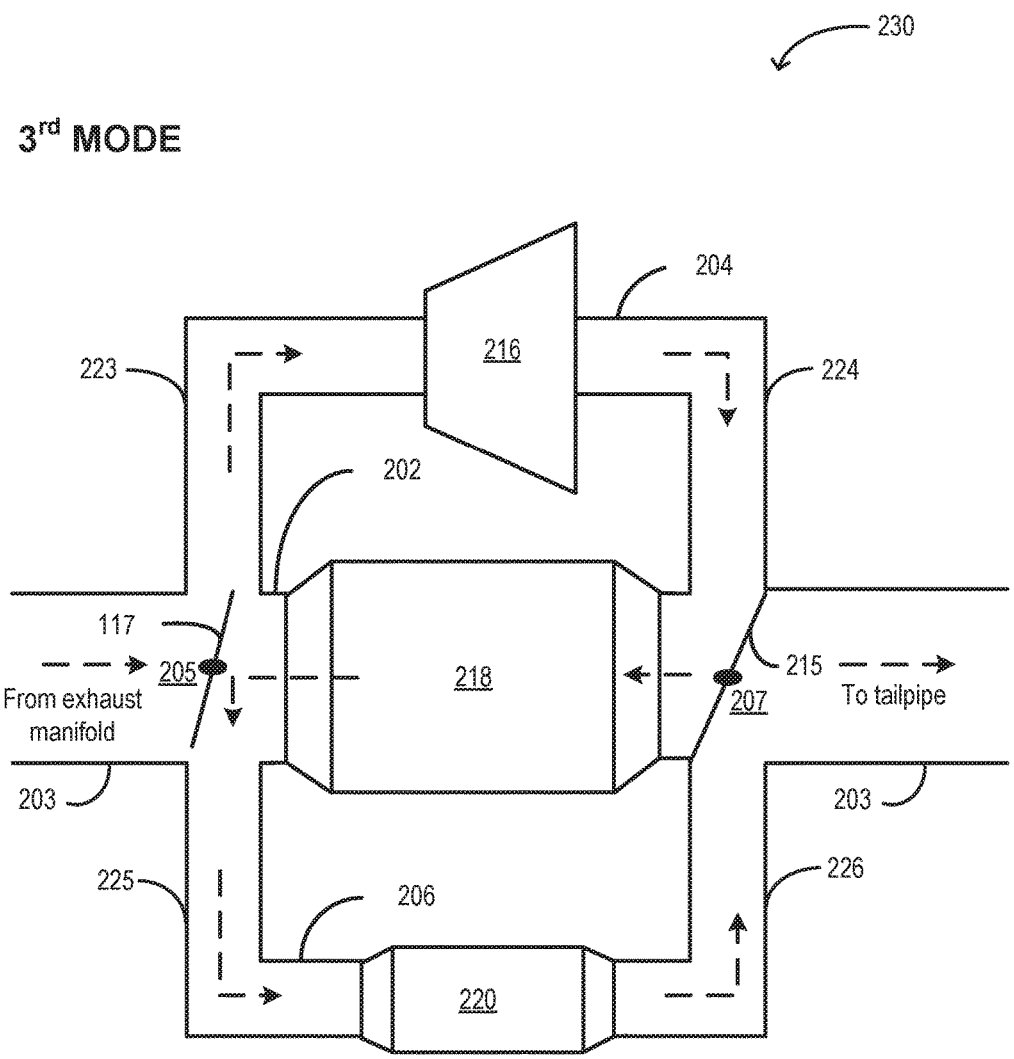
FIG. 2C shows an example embodiment of the branched exhaust assembly of FIG. 1 operating in a third mode.

FIG. 2C shows a schematic view 230 of an example embodiment of the exhaust bypass assembly 200 in a third operating mode. The third operating mode represents a third setting of the four-way valves 217 and 215 that enables exhaust flow control. In the third operating mode, the first four-way valve 217 may be shifted to a third position while the second four-way valve 215 may be maintained in a second position. When in the third operating mode, due to the position of the first valve 217, exhaust flowing downstream via the main exhaust passage 203 may simultaneously enter both the first inlet pipe 223 and the second inlet pipe 225. A first portion of the exhaust may enter the first inlet pipe 223 at junction 205. From the first inlet pipe 223, the exhaust may continue to flow through the turbine 216 housed on the first branch 204 of the exhaust assembly 200, in a first direction (from a first end of the turbine proximal to the engine exhaust manifold to the second end of the turbine proximal to the tailpipe). After exiting the turbine 216, the exhaust continues to flow downstream via the first branch 204 onto the first outlet pipe 224. Due to the position of the second valve 215, upon reaching the junction 207, the exhaust may be routed through the underbody converter 218 housed on the second branch 202 in a second direction (from a second end of the underbody converter proximal to the tailpipe to the first end of the underbody converter proximal to the engine exhaust manifold). After exiting the underbody converter 218, the exhaust continues to flow via the second branch 202 towards the junction 205. At the junction 205, the exhaust may then enter the second inlet pipe 225. From the second inlet pipe 225, the exhaust may continue to flow through the three-way catalyst (TWC) 220 housed on the third branch 206 of the exhaust assembly 200, in a first direction (from a first end of the TWC proximal to the engine exhaust manifold to the second end of the TWC proximal to the tailpipe). After exiting the TWC 220, the exhaust may continue to flow downstream via the third branch 206 onto the second outlet pipe 226. Upon reaching the junction 207 (via the second outlet pipe 226), the exhaust may exit the branched exhaust assembly 200 and may continue to flow downstream towards the tailpipe via the main exhaust passage 203.

A second (remaining) portion of the exhaust may enter the second inlet pipe 225 at junction 205. From the second inlet pipe 225, the exhaust may continue to flow through the TWC 220 housed on the third branch 206 of the exhaust assembly 200. After exiting the TWC 220, the exhaust continues to flow downstream via the third branch 206 onto the second outlet pipe 226. Upon reaching the junction 207, the second portion of the exhaust may exit the branched exhaust assembly 200 and may continue to flow downstream towards the tailpipe via the main exhaust passage 203 without passing through the underbody catalyst and the turbine.

The branched exhaust assembly may be operated in the third operating mode (as described above) during conditions of high engine load. Under such circumstances, by simultaneously flowing exhaust via two branches of the exhaust assembly, a portion (second) of the exhaust may be released to the atmosphere bypassing the turbine while continuing to provide a desired boost to the engine utilizing a remaining portion (first) of the exhaust. The ratio of the first portion of the exhaust to the second portion may be based on driver demand and/or boost error. In one example, due to an increase in the driver demand, the first portion may be increased and the second portion may be correspondingly decreased. In another example, due to a decrease in driver demand, the first portion may be increased and the second portion may be correspondingly increased. In yet another example, during large boost error, the second portion may be increased such that a larger volume of exhaust may bypass the turbine thereby reducing boost error. Boost error is determined based on a difference between a desired boost and the actual boost. Therefore, during high load conditions, boosted performance may be maintained without the requirement of an additional wastegate valve and passage. In this way, based on engine operating conditions and temperature requirements of each component, exhaust may be routed through all three components in the branched exhaust system 200.

In this way, the system of FIGS. 1 and 2A-C provide for an engine system comprising an engine intake manifold; an exhaust assembly with a first branch, a second branch, a third branch, a first valve, and a second valve; a turbocharger with a turbine coupled to the first branch of the exhaust assembly, the turbine connected to a compressor; an underbody converter coupled to the second branch of the exhaust assembly; and a controller with computer readable instructions stored on non-transitory memory for: adjusting each of the first valve and the second valve to flow exhaust through each of the turbine, the underbody converter, and the three-way catalyst via each of the first branch, the second branch, and the third branch, wherein an order of flowing exhaust is based on engine temperature and engine load.

FIGS. 1 and 2A-C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Figure 3:
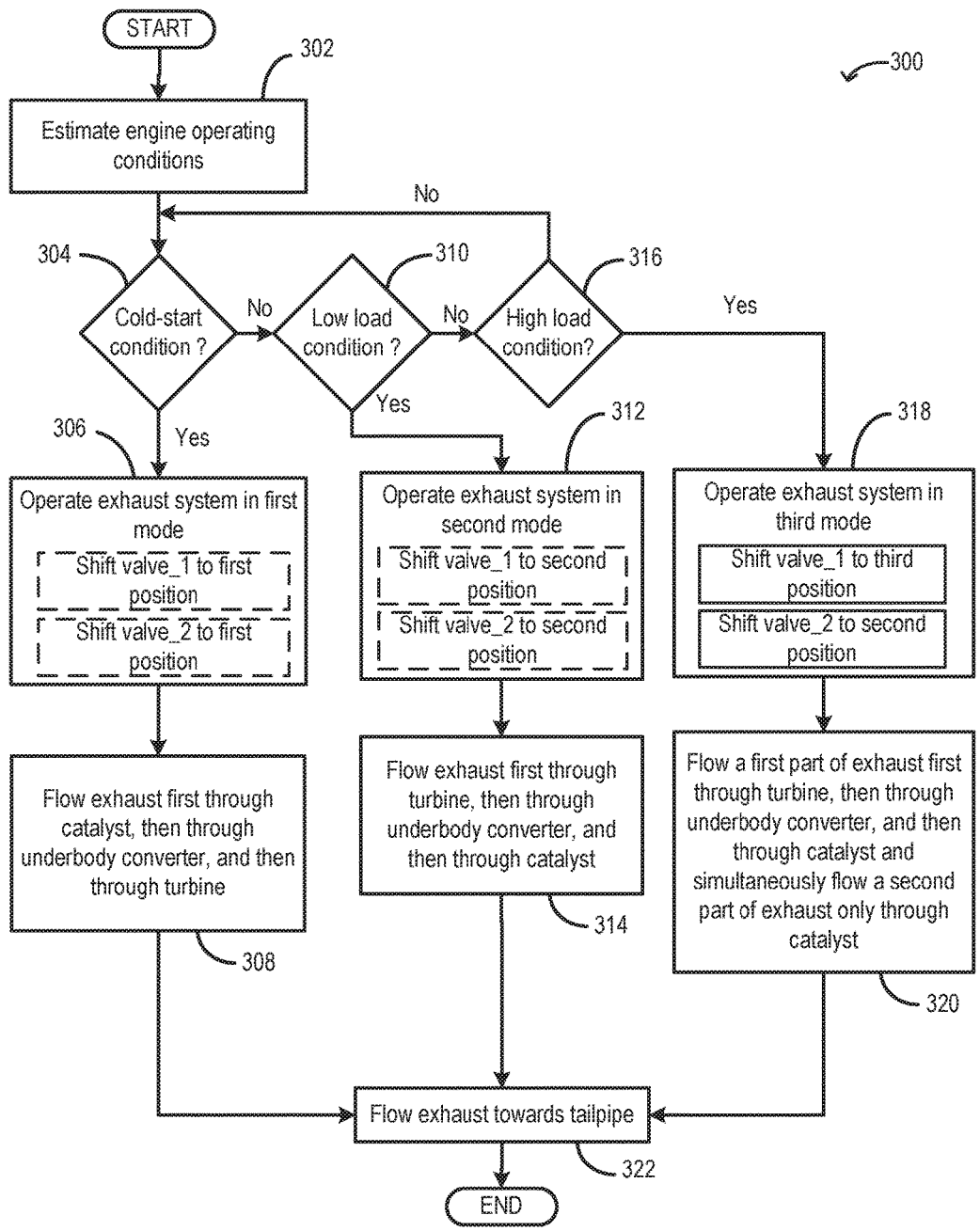
FIG. 3 shows a flow chart illustrating an example method that may be implemented for adjusting exhaust flow through the branched exhaust assembly.

FIG. 3 illustrates an example method 300 that may be implemented for adjusting exhaust flow via different flowpaths of a branched exhaust assembly, such as the assembly of FIG. 1 and FIG. 2. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the routine includes estimating and/or measuring current engine operating conditions. Conditions assessed may include, for example, engine temperature, engine load, engine speed, manifold vacuum, throttle position, exhaust pressure, exhaust air/fuel ratio, etc.

At 304, the routine includes determining if the vehicle engine is operating under cold-start conditions. An engine cold-start condition may be confirmed when the engine is started after a prolonged period of engine inactivity, and when the engine temperature is lower than a threshold. The threshold may be based on a light-off temperature of a three-way catalyst housed on a branch of the exhaust assembly (such as the exhaust assembly 200 in FIG. 2A). Prior to attainment of light-off temperature, the catalyst may not function efficiently, thereby increasing emissions during this time. Cold-start conditions may also be inferred from a lower than threshold ambient temperature.

During cold-start conditions, in order to expedite attainment of catalyst light-off temperature, hot exhaust may first be routed through the catalyst instead of flowing it via the turbine which may act as a heat sink (reducing temperature of catalyst reaching catalyst). Thus, if engine cold-start conditions are confirmed, the routine moves to 306 in order to operate the exhaust assembly in a first operating mode. Operating in the first mode, as described in relation to FIG. 2A, includes shifting the first four-way valve or valve_1 (such as valve 217 in FIG. 2A) located in the exhaust passage upstream of the exhaust assembly to a first position and also shifting the second four-way valve or valve_2 (such as valve 215 in FIG. 2A) located in the exhaust passage downstream of the exhaust assembly to a first position.

At 308, by setting the exhaust assembly to the first operating mode, the entire volume of exhaust flowing downstream via the main exhaust passage may enter an inlet (second) pipe (such as the second inlet pipe 225 in FIG. 2A) and continue to flow through a three-way catalyst (TWC) (such as the three-way catalyst 220 in FIG. 2A) housed on a third branch (such as the third branch 206 in FIG. 2A) of the exhaust assembly. At the TWC, heat from the exhaust may be utilized to increase the temperature of the TWC. By expediting attainment of TWC light-off temperature, quality of emissions may be improved. After exiting the TWC, the exhaust may continue to flow downstream via the third branch onto an outlet (second) pipe (such as the second outlet pipe 226 in FIG. 2A). From thereon, the exhaust may be routed through an underbody converter (such as the underbody converter 218 in FIG. 2A) housed on a second branch (such as the second branch 202 in FIG. 2A) of the exhaust assembly. After exiting the underbody converter, the exhaust may continue to flow towards a turbine (such as the turbine 216 in FIG. 2A) housed on a first branch (such as the first branch 204 in FIG. 2A) of the exhaust assembly, via an inlet (first) pipe (such as the first inlet pipe 223 in FIG. 2A). By flowing exhaust through the turbine, boost may be provided to the engine even during cold-start conditions. After exiting the turbine, the exhaust may continue to flow downstream via the first branch onto the outlet (first) pipe (such as the first outlet pipe 224 in FIG. 2A) and from thereon may exit the exhaust assembly.

By adjusting exhaust flow to route hot exhaust first through the TWC, before flowing the exhaust through the remaining exhaust components (turbine and underbody catalyst), exhaust heat may be effectively transferred to the catalyst, expediting catalyst activation. In this way, hot exhaust may be effectively used for increasing TWC temperature without the requirement of spark retard, thereby increasing fuel efficiency of the engine. Also, by routing the exhaust through the turbine, any delay in turbine spin-up may be reduced thereby reducing turbo-lag and enhancing boost performance. After exiting the exhaust assembly, at 322, the exhaust may flow towards the tailpipe. After passing through a muffler, the exhaust may be released to the atmosphere.

If it is determined (at 304) that the engine is not operating under cold-start conditions, it may be inferred that the catalyst has reached the light-off temperature and is functioning effectively for emissions control. At 310, the routine includes determining if the vehicle engine is operating under low (or moderate) load conditions.

If engine low load conditions are confirmed, the routine moves to 312 in order to operate the exhaust assembly in a second operating mode. Operating in the second mode, as described in relation to FIG. 2B, includes shifting the first four-way valve (valve_1) to a second position and also shifting the second four-way valve (valve_2) to a second position.

At 314, by setting the exhaust assembly to the second operating mode, the entire volume of exhaust flowing downstream via the main exhaust passage may enter the first inlet pipe and continue to flow through the turbine housed on the first branch of the exhaust assembly. By flowing hot exhaust through the turbine, desired boost may be provided to the engine. Also, as the exhaust flows through the turbine, the temperature of the exhaust decreases. After exiting the turbine, the exhaust continues to flow downstream via the first branch onto the first outlet pipe. From thereon, the exhaust may be routed through the underbody converter housed on the second branch. After exiting the underbody converter, the exhaust may continue to flow towards the TWC housed on the third branch, via second inlet pipe. The temperature of exhaust passing though the TWC is lower compared to the temperature of exhaust entering the turbine in this mode, thereby facilitating optimal performance of the TWC. After exiting the TWC, the exhaust may exit the branched exhaust assembly via the second outlet pipe.

By adjusting exhaust flow to route hot exhaust first through the turbine, boost performance may be enhanced, and also the temperature of the exhaust may be reduced. Owing to the coating on the catalyst surface, the low temperature exhaust may facilitate a higher conversion efficiency of the TWC. After exiting the exhaust assembly (operated in second mode), at 322, the exhaust may flow towards the tailpipe. After passing through a muffler, the exhaust may be released to the atmosphere.

If it is determined (at 310) that the engine is not operating under low (or moderate) conditions, the routine includes determining if the vehicle engine is operating under high load conditions at 316. During high load conditions, the flow of exhaust may increase substantially and the entire volume of exhaust may not be routed through the turbine in order to reduce boost errors, and avoid damage to the turbocharger components.

If engine high load conditions are confirmed, the routine moves to 318 in order to operate the exhaust assembly in the third operating mode. Operating in the third mode, as described in relation to FIG. 2C, includes shifting the first four-way valve (valve_1) to a third position while maintaining (or shifting) the second four-way valve (valve_2) in the second position. Otherwise, if the answer to 316 is NO, the routine returns and does not carry out any of 306/308, 312/314, or 318/320. For example, in some embodiments, the actions of these blocks are only carried out under the conditions specified.

At 320, by setting the exhaust assembly to the third operating mode, exhaust flowing downstream via the main exhaust passage may be simultaneously routed via both the first inlet pipe and the second inlet pipe. A first portion of the exhaust may enter the first inlet pipe and may continue to flow through the turbine housed on the first branch of the exhaust assembly. By varying the portion of the exhaust routed through the turbine, boost provided to the engine may be regulated during high load conditions. Also, as the exhaust flows through the turbine, the temperature of the exhaust decreases. After exiting the turbine, the exhaust may flow downstream via the first branch onto the first outlet pipe. From thereon, the exhaust may be routed through the underbody converter housed on the second branch. After exiting the underbody converter, the exhaust may continue to flow towards the TWC housed on the third branch, via second inlet pipe. The temperature of exhaust passing though the TWC may be lower, thereby facilitating optimal performance of the TWC. After exiting the TWC, the exhaust may exit the branched exhaust assembly via the second outlet pipe. A second (remaining) portion of the exhaust may enter the second inlet pipe and may continue to flow through the TWC housed on the third branch of the exhaust assembly. From thereon, the exhaust may exit the branched exhaust assembly via the second outlet pipe without passing through the underbody catalyst and the turbine. The fraction of exhaust routed via the turbine compared to the fraction of exhaust routed only via the TWC may be determined based on engine operating conditions and boost requirement.

The ratio of the first portion of the exhaust to the second portion may be based on parameters such as driver demand and boost error. In one example, as the driver demand increases, the first portion may be increased in relation to the second portion. During low driver demand, a larger volume of exhaust (as the second portion) may be routed directly through the third branch, bypassing the turbine. In another example, a desired boost may be lower than the actual boost causing a boost error. Under such circumstances, the second portion may be increased such that a larger volume of exhaust may bypass the turbine, thereby reducing boost error.

After exiting the exhaust assembly (operated in third mode), at 322, each of the first and the second portion of the exhaust may flow towards the tailpipe. After passing through a muffler, the entire volume of exhaust may be released to the atmosphere.

By simultaneously flowing exhaust via two branches of the exhaust assembly, a portion of the exhaust may be released to the atmosphere bypassing the turbine while continuing to provide a desired boost to the engine utilizing a remaining portion of the exhaust. Therefore, during high load conditions, boost performance may be maintained without the requirement of an additional wastegate valve and passage.

In this way, depending on the temperature requirement of each component (TWC, underbody converter, and turbine), exhaust flow-path may be adjusted in three modes without bypassing any component, thereby optimizing engine performance. The first mode may be selected when the engine temperature is below a threshold, the second mode may be selected when the engine temperature is above the threshold, the threshold based on a catalyst light-off temperature, and the third mode may be selected when engine load is higher than a threshold load.

FIG. 4 is a table 400 showing example modes of operation of the branched exhaust assembly of FIG. 1. An engine controller may select one of the operating modes based on engine conditions and heating requirements of each component (turbine, underbody converter, and three-way catalyst) of the exhaust assembly. Based on the selected operating mode, positions of two four-way valves coupled to an exhaust passage upstream and downstream of the exhaust assembly, respectively, may be varied. By varying the position of the valves, the direction of exhaust flow through the three branches of the exhaust assembly may be adjusted.

In one example, the controller may operate the exhaust assembly in a first operating mode such as during a cold-start condition when the engine temperature is low. During this time, the engine load may be low or moderate. Due to the cold-start condition, the three-way catalyst (TWC) may not have attained its light-off temperature, causing an increased level of emissions. Therefore during this time, in order to route hot exhaust first through the TWC, each of the first valve (valve-1) and the second valve (valve_2) may be shifted to their respective first positions. Due to the given valve setting, the entire volume of hot exhaust may first flow through the TWC in a first direction (from a first end of the TWC proximal to the engine exhaust manifold to the second end of the TWC proximal to the tailpipe), wherein heat from the exhaust may be utilized to increase the TWC temperature. After exiting the TWC, exhaust may flow through the underbody converter in a second direction (from a second end of the underbody converter proximal to the tailpipe to the first end of the underbody converter proximal to the engine exhaust manifold) and then through the turbine in a first direction (from a first end of the turbine proximal to the engine exhaust manifold to the second end of the turbine proximal to the tailpipe). In this way, during cold-start conditions, in addition to providing heat to the TWC (for attainment of light-off temperature), a desired boost may be provided for engine operation.

In another example, the controller may operate the exhaust assembly in a second operating mode such as during operating conditions when the engine temperature is high (warm engine). During this time, the engine load may be low or moderate. Also, it may be inferred that the catalyst has attained the light-off temperature and is optimally functional. After catalyst light-off, owing to a coating on the catalyst surface, the catalyst may have higher conversion efficiencies at lower exhaust temperatures. Therefore during this time, in order to route low temperature exhaust through the TWC while providing a desired boost, each of the first valve (valve-1) and the second valve (valve_2) may be shifted to their respective second positions. Due to the given valve setting, the entire volume of hot exhaust may first flow through the turbine in a first direction (from a first end of the turbine proximal to the engine exhaust manifold to the second end of the turbine proximal to the tailpipe), wherein the exhaust may be utilized to provide boost to the engine. Also, the exhaust temperature may reduce at the turbine. After exiting the turbine, the exhaust may flow through the underbody converter in a second direction (from a second end of the underbody converter proximal to the tailpipe to the first end of the underbody converter proximal to the engine exhaust manifold) and then through the TWC in a first direction (from a first end of the TWC proximal to the engine exhaust manifold to the second end of the TWC proximal to the tailpipe). Due to the low temperature of the exhaust reaching the TWC, optimal performance of the TWC may be facilitated. In this way, after catalyst light-off, a desired boost may be provided to the engine and exhaust of desired temperature may be routed through the TWC.

In yet another example, the controller may operate the exhaust assembly in a third operating mode such as during operating conditions when the engine load is high. During this time, the engine temperature may also be high (warm engine). During high load conditions, the flow of exhaust may increase substantially and the entire volume of exhaust may not be routed through the turbine in order to avoid a damage to the turbocharger components. Therefore during this time, in order to simultaneously route exhaust via multiple flow-paths, the first valve (valve-1) is shifted to a third position while the second valve (valve_2) is maintained in the second position. Due to the given valve setting, a first portion of the exhaust may be routed through the turbine in a first direction (from a first end of the turbine proximal to the engine exhaust manifold to the second end of the turbine proximal to the tailpipe), wherein the exhaust may be utilized to provide boost to the engine. After exiting the turbine, the first portion of the exhaust may flow through the underbody converter in a second direction (from a second end of the underbody converter proximal to the tailpipe to the first end of the underbody converter proximal to the engine exhaust manifold) and then through the TWC. Due to the low temperature of the exhaust reaching the TWC, optimal performance of the TWC may be facilitated. Simultaneously, a second (remaining) part of the exhaust may be routed only through the catalyst bypassing the turbine and the underbody converter. In this way, during high load conditions, by simultaneously flowing exhaust via two flow-paths of the exhaust assembly, a portion of the exhaust may be released to the atmosphere bypassing the turbine while continuing to provide a desired boost to the engine utilizing a remaining portion of the exhaust.

As an example, transitioning from the first to the second mode may be responsive to activation of the catalyst, transitioning from the second mode to the third mode may be responsive to an increase in demanded torque, and transitioning from the third mode to the first mode may be responsive to an engine shutdown request. In this way, a plurality of multi-way valves may be used to regulate exhaust gas flow through different flow-paths in a branched exhaust assembly operating in different modes. The direction of flow through each component of the assembly (in each of the three modes) may be effectively regulated based on engine operating conditions and temperature requirement of the components. By housing distinct exhaust components in different branches/flow paths of a branched exhaust assembly, exhaust flow through each of the components may be varied. Also, on order of exhaust flow may be varied and one or more components may be at least partially bypassed despite their order relative to one another.

Figure 5:
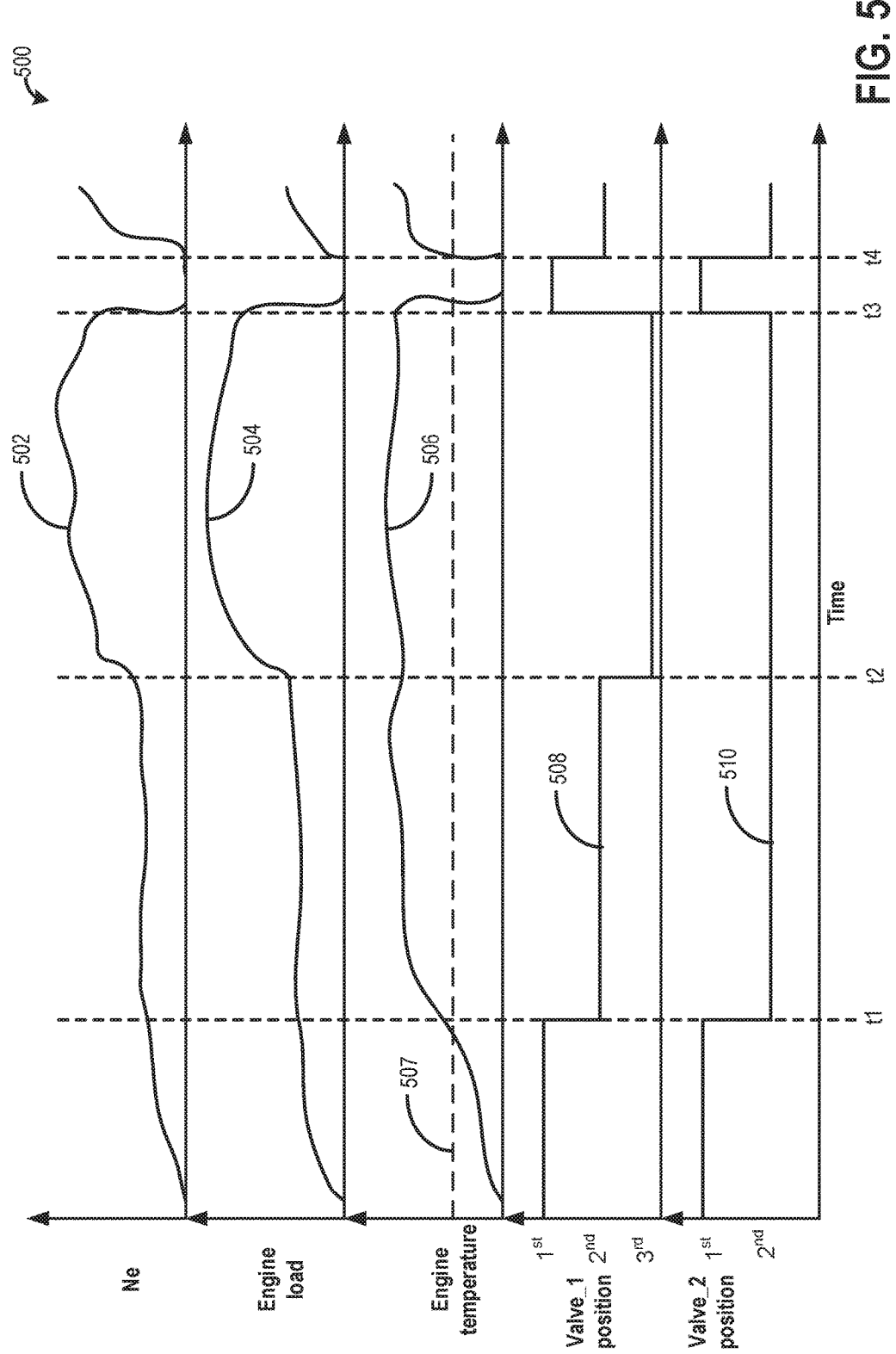
FIG. 5 shows an example operation of the branched exhaust assembly.

FIG. 5 shows an example operating sequence 500 illustrating operation of the branched exhaust assembly of FIG. 1. The direction of exhaust flow through the different flow-paths with different components is determined based on engine operating conditions and temperature requirement of each component. The horizontal (x-axis) denotes time and the vertical markers t1-t4 identify significant times in the operation of the exhaust bypass assembly system.

The first plot (line 502) from the top shows variation in engine speed over time and the second plot (line 504) shows variation in engine load over time. The third plot (line 507) shows change in engine temperature over time. The dotted line 507 denotes a threshold temperature below which the engine temperature may be considered to be low, such as during cold-start conditions. Once the engine temperature increases to above the threshold 507, the engine may be considered to be warm enough for the three-way catalyst (TWC) to be activated. The fourth plot (line 508) shows a position of a first four-way valve (valve_1) coupled to the exhaust passage upstream of the branched exhaust assembly. The fifth and final plot (line 510) shows a position of a second four-way valve (valve_2) coupled to the exhaust passage downstream of the branched exhaust assembly.

Prior to time t1, the engine starts from rest after a period of inactivity during which the vehicle was not propelled. The engine may start under cold-start conditions with low engine temperature (below the threshold temperature 507). Also, as the engine starts, the engine speed is low and the engine speed gradually increases to an idle level. During this time, the engine may be operated under moderate load conditions. Due to the cold-start conditions, the TWC (such as the TWC 120 in FIG. 1) coupled to the third branch of the exhaust assembly may not have attained its light-off temperature. Therefore, during this time, in order to expedite catalyst warming, the controller may route hot exhaust first through the TWC. To route hot exhaust first through the TWC, each of the first valve (valve-1) and the second valve (valve_2) may be shifted to their respective first positions. Due to the given valve setting, the entire volume of hot exhaust may first flow through the TWC, wherein heat from the exhaust may be utilized to increase the TWC temperature. After exiting the TWC, the exhaust may flow through the underbody converter (such as the underbody converter 118 in FIG. 1) coupled to the second branch of the exhaust assembly and then through the turbine (such as the turbine 116 in FIG. 1). At the turbine, a desired boost may be provided for engine operation.

At time t1, as the engine temperature increases to higher than the threshold temperature (507), it may be inferred that the TWC has attained the light-off temperature and is activated. As such, owing to a coating on the catalyst surface, the catalyst may have higher conversion efficiencies at lower exhaust temperatures. Therefore, after TWC activation, in order to route low temperature exhaust through the TWC while providing a desired boost, each of the first valve (valve-1) and the second valve (valve_2) may be shifted to their respective second positions. Due to the given valve setting, the entire volume of hot exhaust may first flow through the turbine, wherein the exhaust may be utilized to provide a desired boost to the engine. Also, the exhaust temperature may reduce upon flow through the turbine. After exiting the turbine, the exhaust may flow through the underbody converter and then through the TWC. Due to the low temperature of the exhaust reaching the TWC, optimal performance of the TWC may be facilitated.

At time t2, there is an increase in engine speed and engine load to high load conditions. Due to the high load conditions, between time t2 and t3, the flow of exhaust may increase substantially and the entire volume of exhaust may not be routed through the turbine in order to reduce boost error and avoid damage to the turbocharger components. Instead, the entire volume of exhaust may be divided into two parts and the two parts may be routed via two different flow paths of the branched assembly, simultaneously. The ratio of the two parts may depend on driver demand and boost error. In one example, the second portion (of exhaust) may be reduced and the corresponding first portion may be increased when the driver demand increases. Also, the second portion may be increased and the corresponding first portion may be decreased as the boost error increases. The boost error may be defined as a difference between an actual boost and a desired boost. Therefore, during this time, in order to simultaneously route exhaust via two flow-paths, the first valve (valve-1) is shifted to a third position while the second valve (valve_2) is maintained in the second position. Due to the given valve setting, a first portion of the exhaust may be routed through the turbine, wherein the exhaust may be utilized to provide boost to the engine. After exiting the turbine, the first portion of the exhaust may flow through the underbody converter and then through the TWC. Due to the low temperature of the exhaust reaching the TWC, optimal performance of the TWC may be facilitated. Simultaneously, a second (remaining) portion of the exhaust may be routed only through the catalyst, bypassing the turbine and the underbody converter.

In this way, during high load conditions, by simultaneously flowing exhaust via two flow-paths of the exhaust assembly, a portion of the exhaust may be released to the atmosphere bypassing the turbine while continuing to provide a desired boost to the engine utilizing a remaining portion of the exhaust.

At time t3, there may be an engine shutdown request, owing to which, engine speed and engine load may be reduced. The position of each of the first and second valves (valve_1 and valve_2) may be shifted to its corresponding first position. The first position of each of the two valves may be the default setting of the valves during an engine shut-down. Between time t3 and t4, the engine continues to be shut down and engine temperature is not measured. At time t4, an engine restart request is received responsive to which the engine starts from rest. Herein the engine is restarted after a shorter duration compared to a last shut down. Therefore, the engine may start under hot-start conditions with engine temperature above the threshold temperature 507. Also, as the engine starts, the engine speed and engine load increases steadily. Due to the higher engine temperature at the restart, each of the first valve (valve-1) and the second valve (valve_2) may be shifted to their respective second positions. Due to the given valve setting, the entire volume of hot exhaust may first flow through the turbine, wherein a desired boost may be provided to the engine and correspondingly, the exhaust temperature may be reduced. After exiting the turbine, the lower temperature exhaust may flow through the underbody converter and then through the TWC. After time t4, the exhaust assembly continues to operate in this mode.

In this way, by adjusting a position of a plurality of valves coupled to a branched exhaust system having a first, a second and a third branch, each branch housing a distinct exhaust component, an order of exhaust flow through the distinct exhaust component may be varied while flowing exhaust through each of the distinct exhaust components.

In one example, a method comprises, during an engine cold-start, flowing exhaust first through a three-way catalyst then through an underbody converter and then a turbine; after catalyst light-off, flowing exhaust first through the turbine, then through the underbody converter and then through the three-way catalyst; and during high load operation, bypassing the turbine at least partially. In the preceding example method, additionally or optionally, the bypassing includes flowing a first portion of exhaust through the three-way catalyst then through the underbody converter and then the turbine, and flowing a second, remaining portion of the exhaust only through the three-way catalyst while bypassing each of the turbine and the underbody catalyst. In any or all of the preceding examples, a ratio of the first portion to the second portion is additionally or optionally adjusted based on driver demand and boost error. In any or all of the preceding examples, additionally or optionally, the adjusting includes decreasing the second portion while correspondingly increasing the first portion as the driver demand increases, and increasing the second portion while correspondingly decreasing the second portion as the boost error increases, the boost error including a difference between an actual boost and a desired boost. In any or all of the preceding examples, additionally or optionally, the three-way catalyst, the underbody converter, and the turbine are housed in distinct branches of a branched exhaust assembly, the distinct branches fluidically connected to each other via each of a first valve and a second valve. In any or all of the preceding examples, additionally or optionally, flowing exhaust first through a three-way catalyst then through an underbody converter and then a turbine includes flowing exhaust first through the three-way catalyst housed on a third branch in a first direction, then flowing exhaust through the underbody converter housed on a second branch in a second direction, and then flowing exhaust through the turbine housed on a first branch in the first direction, the second direction is opposite to the first direction; wherein flowing exhaust first through the turbine, then through the underbody converter and then through the three-way catalyst includes flowing exhaust first through the turbine housed on the first branch in the first direction, then through the underbody converter housed on the second branch in the second direction, and then through the three-way catalyst housed on a third branch in the first direction; and wherein bypassing the turbine at least partially includes flowing a first portion of exhaust first through the turbine housed on the first branch in the first direction, then through the underbody converter housed on the second branch in the second direction, and then through the three-way catalyst housed on the third branch in the first direction, and simultaneously flowing a second portion of exhaust, only through the third branch in the first direction while bypassing each of the turbine and the underbody catalyst. In any or all of the preceding examples, additionally or optionally, the first valve is coupled to each of a first end of the first branch, a first end of the second branch, and a first end of the third branch, and wherein the second valve is coupled to each of a second end of the first branch, a second end of the second branch and a second end of the third branch. In any or all of the preceding examples, additionally or optionally, flowing exhaust during the cold-start includes actuating the first valve to a first position and the second valve to a first position, wherein flowing exhaust after catalyst light-off includes actuating the first valve to a second position and the second valve to a second position, and wherein flowing exhaust during high load operation includes actuating the first valve to a third position and the second valve to the second position.

In another example, an engine method comprises adjusting a position of a plurality of valves coupled to each of a first, second, and third branch of a branched exhaust system, each branch housing a distinct exhaust component, to vary an order of exhaust flow through the distinct exhaust components while flowing exhaust through each of the distinct exhaust components. In the preceding example method, additionally or optionally, the adjusting includes: operating in a first mode with a first valve in a first position and a second valve in a first position to flow exhaust first through a three-way catalyst housed on the third branch of the branched exhaust system then through an underbody converter housed on the second branch of the branched exhaust system and then through a turbine housed on the first branch of the branched exhaust system; operating in a second mode with the first valve in a second position and the second valve in a second position to flow exhaust first through the turbine, then through the underbody converter and then through the three-way catalyst; and operating in a third mode with the first valve in a third position and the second valve in the second position to flow a first portion of exhaust first through the turbine, then through the underbody converter and then through the three-way catalyst and a second portion of exhaust flowing through the three-way catalyst bypassing the turbine and the underbody converter. Any or all of the preceding examples further comprises, additionally or optionally, selecting between the first mode, the second mode, and the third mode based on engine temperature, and engine load. In any or all of the preceding examples, additionally or optionally, the selecting includes selecting the first mode when the engine temperature is below a threshold, selecting the second mode when the engine temperature is above the threshold, the threshold based on a catalyst light-off temperature, and selecting the third mode when engine load is higher than a threshold load. Any or all of the preceding examples further comprises, additionally or optionally, transitioning from the first to the second mode responsive to activation of the catalyst, transitioning from the second mode to the third mode responsive to an increase in demanded torque, and transitioning from the third mode to the first mode responsive to an engine shutdown request. In any or all of the preceding examples, each of the first mode, the second mode and the third mode additionally or optionally include flowing exhaust through the first branch in a first direction, flowing exhaust through the second branch in a second direction, and flowing exhaust through the third branch in the first direction, the first direction opposite to the second. In any or all of the preceding examples, additionally or optionally, in the third mode, a ratio of the first portion to the second portion is based on driver demand and boost error. In any or all of the preceding examples, additionally or optionally, the first mode includes transferring heat from exhaust to the three-way catalyst to increase a catalyst temperature.

In yet another example, an engine system comprises an engine intake manifold; an exhaust assembly with a first branch, a second branch, a third branch, a first valve, and a second valve; a turbocharger with a turbine coupled to the first branch of the exhaust assembly, the turbine connected to a compressor; an underbody converter coupled to the second branch of the exhaust assembly; and a controller with computer readable instructions stored on non-transitory memory for: adjusting each of the first valve and the second valve to flow exhaust through each of the turbine, the underbody converter, and the three-way catalyst via each of the first branch, the second branch, and the third branch, wherein an order of flowing exhaust is based on engine temperature and engine load. In the preceding example method, additionally or optionally, the flowing of exhaust includes, during a first condition, flowing exhaust first through the third branch with the three-way catalyst, then through the second branch with the underbody converter, and then through the first branch with the turbine; during a second condition, flowing exhaust first through the first branch with the turbine, then through the second branch with the underbody converter, and then through the third branch with the three-way catalyst; during a third condition, flowing a first portion of exhaust first through the first branch with the turbine, then through the second branch with the underbody converter, and then through the third branch with the three-way catalyst, and flowing a second portion of the exhaust through the three-way catalyst bypassing the turbine and the underbody converter. In any or all of the preceding examples, additionally or optionally, the first condition includes a cold-start condition, the second condition includes a higher than threshold engine temperature and a lower than threshold engine load, and the third condition includes a higher than threshold engine temperature and a higher than threshold engine load, wherein the threshold engine temperature is based on a catalyst light-off temperature. In any or all of the preceding examples, additionally or optionally, during the first condition, each of the first valve and the second valve are adjusted to flow exhaust through the first branch and the third branch in a first direction, and through the second branch in a first direction; during the second condition, each of the first valve and the second valve are adjusted to flow exhaust through the first branch and the third branch in a first direction, and through the second branch in a first direction; and during the third condition, each of the first valve and the second valve are adjusted to flow a first portion of the exhaust through the first branch and the third branch in a first direction, and through the second branch in a first direction and a second portion of the exhaust through the third branch in the first direction bypassing the first and the second branch.

In this way, by housing distinct exhaust components in different branches/flow paths of a branched exhaust assembly, exhaust flow through the components may be varied. For example, on order of exhaust flow may be varied and one or more components may be at least partially bypassed despite their order relative to one another. In this way, by flowing exhaust through distinct exhaust components housed on different branches of a branched exhaust assembly, it is possible to expedite attainment of catalyst light-off temperature while providing boost to the engine during cold-start conditions. Exhaust may be routed to flow through each of the exhaust components in different directions based on engine operating conditions and temperature requirement of the respective components. After attainment of catalyst light-off temperature, by adjusting the exhaust flow to route the hot exhaust first through the turbine before flowing through the remaining exhaust components, a desired engine boost may be provided and also a temperature of the exhaust reaching the catalyst may be lowered, thereby improving catalyst conversion efficiency. During high engine load conditions, by utilizing multiple flow paths to route exhaust via the exhaust assembly, it is possible to partially bypass the turbine thereby reducing the possibility of boost error. The technical effect of using a pair of valves to regulate exhaust flow through the exhaust components housed in distinct branches of the branched exhaust assembly is that depending on engine operating conditions and temperature demands of each exhaust component, the order of exhaust flow through each exhaust component may be varied irrespective of the position of the exhaust components relative to each other in the exhaust assembly. In addition, the flow may be varied using fewer components. For example, by utilizing the two exhaust assembly valves, reliance on additional wastegate valves and wastegate passage may be reduced. By adjusting the order of exhaust flow through each exhaust component engine efficiency, emissions quality, and fuel efficiency may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during an engine cold-start, flowing exhaust first through a three-way catalyst, then through an underbody converter, and then a turbine;
after catalyst light-off, flowing exhaust first through the turbine, then through the underbody converter, and then through the three-way catalyst; and
during high load operation, bypassing the turbine at least partially.

2. The method of claim 1, wherein the bypassing includes flowing a first portion of exhaust through the three-way catalyst, then through the underbody converter, and then the turbine, and flowing a second, remaining portion of the exhaust only through the three-way catalyst while bypassing each of the turbine and the underbody converter.

3. The method of claim 2, wherein a ratio of the first portion to the second portion is adjusted based on driver demand and boost error.

4. The method of claim 3, wherein the adjusting includes decreasing the second portion while correspondingly increasing the first portion as the driver demand increases, and increasing the second portion while correspondingly decreasing the first portion as the boost error increases, the boost error including a difference between an actual boost and a desired boost.

5. The method of claim 1, wherein the three-way catalyst, the underbody converter, and the turbine are housed in distinct branches of a branched exhaust assembly, the distinct branches fluidically connected to each other via each of a first valve and a second valve.

6. The method of claim 5, wherein flowing exhaust first through the three-way catalyst, then through the underbody converter, and then through the turbine includes flowing exhaust first through the three-way catalyst housed on a third branch in a first direction, then flowing exhaust through the underbody converter housed on a second branch in a second direction, and then flowing exhaust through the turbine housed on a first branch in the first direction, the second direction opposite to the first direction;
wherein flowing exhaust first through the turbine, then through the underbody converter, and then through the three-way catalyst includes flowing exhaust first through the turbine housed on the first branch in the first direction, then through the underbody converter housed on the second branch in the second direction, and then through the three-way catalyst housed on the third branch in the first direction; and
wherein bypassing the turbine at least partially includes flowing a first portion of exhaust first through the turbine housed on the first branch in the first direction, then through the underbody converter housed on the second branch in the second direction, and then through the three-way catalyst housed on the third branch in the first direction, and simultaneously flowing a second portion of exhaust only through the three-way catalyst housed on the third branch in the first direction while bypassing each of the turbine and the underbody converter.

7. The method of claim 5, wherein the first valve is coupled to each of a first end of a first branch, a first end of a second branch, and a first end of a third branch, and wherein the second valve is coupled to each of a second end of the first branch, a second end of the second branch, and a second end of the third branch.

8. The method claim 5, wherein flowing exhaust during the cold-start includes actuating the first valve to a first position and the second valve to a first position, wherein flowing exhaust after catalyst light-off includes actuating the first valve to a second position and the second valve to a second position, and wherein flowing exhaust during high load operation includes actuating the first valve to a third position and the second valve to the second position.

9. An engine method, comprising:
adjusting a position of a plurality of valves coupled to each of a first, second, and third branch of a branched exhaust system, each branch housing a distinct exhaust component, to vary an order of exhaust flow through the distinct exhaust components while flowing exhaust through each of the distinct exhaust components, wherein the adjusting includes:
operating in a first mode with a first valve in a first position and a second valve in a first position to flow exhaust first through a three-way catalyst housed on the third branch of the branched exhaust system, then through an underbody converter housed on the second branch of the branched exhaust system, and then through a turbine housed on the first branch of the branched exhaust system;
operating in a second mode with the first valve in a second position and the second valve in a second position to flow exhaust first through the turbine, then through the underbody converter, and then through the three-way catalyst; and
operating in a third mode with the first valve in a third position and the second valve in the second position to flow a first portion of exhaust first through the turbine, then through the underbody converter, and then through the three-way catalyst, and to flow a second portion of exhaust through the three-way catalyst bypassing the turbine and the underbody converter.

10. The method claim 9, further comprising selecting between the first mode, the second mode, and the third mode based on engine temperature and engine load.

11. The method of claim 10, wherein the selecting includes selecting the first mode when the engine temperature is below a threshold, selecting the second mode when the engine temperature is above the threshold, the threshold based on a catalyst light-off temperature, and selecting the third mode when engine load is higher than a threshold load.

12. The method of claim 9, further comprising transitioning from the first mode to the second mode responsive to activation of the three-way catalyst, transitioning from the second mode to the third mode responsive to an increase in demanded torque, and transitioning from the third mode to the first mode responsive to an engine shutdown request.

13. The method of claim 9, wherein each of the first mode, the second mode, and the third mode includes flowing exhaust through the first branch in a first direction, flowing exhaust through the second branch in a second direction, and flowing exhaust through the third branch in the first direction, the first direction opposite to the second direction.

14. The method of claim 9, wherein in the third mode, a ratio of the first portion to the second portion is based on driver demand and boost error.

15. The method of claim 9, wherein the first mode includes transferring heat from exhaust to the three-way catalyst to increase a catalyst temperature.

16. An engine system, comprising:
an engine intake manifold;
an exhaust assembly with a first branch, a second branch, a third branch, a first valve, and a second valve;
a turbocharger with a turbine coupled to the first branch of the exhaust assembly, the turbine connected to a compressor;
an underbody converter coupled to the second branch of the exhaust assembly; and
a controller with computer readable instructions stored on non-transitory memory for:
adjusting each of the first valve and the second valve to flow exhaust through each of the turbine, the underbody converter, and a three-way catalyst via each of the first branch, the second branch, and the third branch, wherein an order of flowing exhaust is based on engine temperature and engine load.

17. The system of claim 16, wherein the flowing of exhaust includes, during a first condition, flowing exhaust first through the third branch with the three-way catalyst, then through the second branch with the underbody converter, and then through the first branch with the turbine;
during a second condition, flowing exhaust first through the first branch with the turbine, then through the second branch with the underbody converter, and then through the third branch with the three-way catalyst;
during a third condition, flowing a first portion of exhaust first through the first branch with the turbine, then through the second branch with the underbody converter, and then through the third branch with the three-way catalyst, and flowing a second portion of the exhaust through the three-way catalyst bypassing the turbine and the underbody converter.

18. The system of claim 17, wherein the first condition includes a cold-start condition, the second condition includes a higher than threshold engine temperature and a lower than threshold engine load, and the third condition includes a higher than threshold engine temperature and a higher than threshold engine load, wherein the threshold engine temperature is based on a catalyst light-off temperature.

19. The system of claim 17, wherein, during the first condition, each of the first valve and the second valve are adjusted to flow exhaust through the first branch and the third branch in a first direction, and through the second branch in a second direction;
during the second condition, each of the first valve and the second valve are adjusted to flow exhaust through the first branch and the third branch in the first direction, and through the second branch in the second direction; and
during the third condition, each of the first valve and the second valve are adjusted to flow the first portion of the exhaust through the first branch and the third branch in the first direction, and through the second branch in the second direction, and to flow the second portion of the exhaust through the third branch in the first direction bypassing the first and the second branches.

20. The method of claim 9, wherein each of the plurality of valves is a four-way valve.

* * * * *